Aug. 16, 1960 K. N. CEDERQUIST 2,949,010
CONTINUOUS METHOD OF BURNING HIGHLY HYDROUS ORGANIC MATERIALS
Filed March 24, 1955
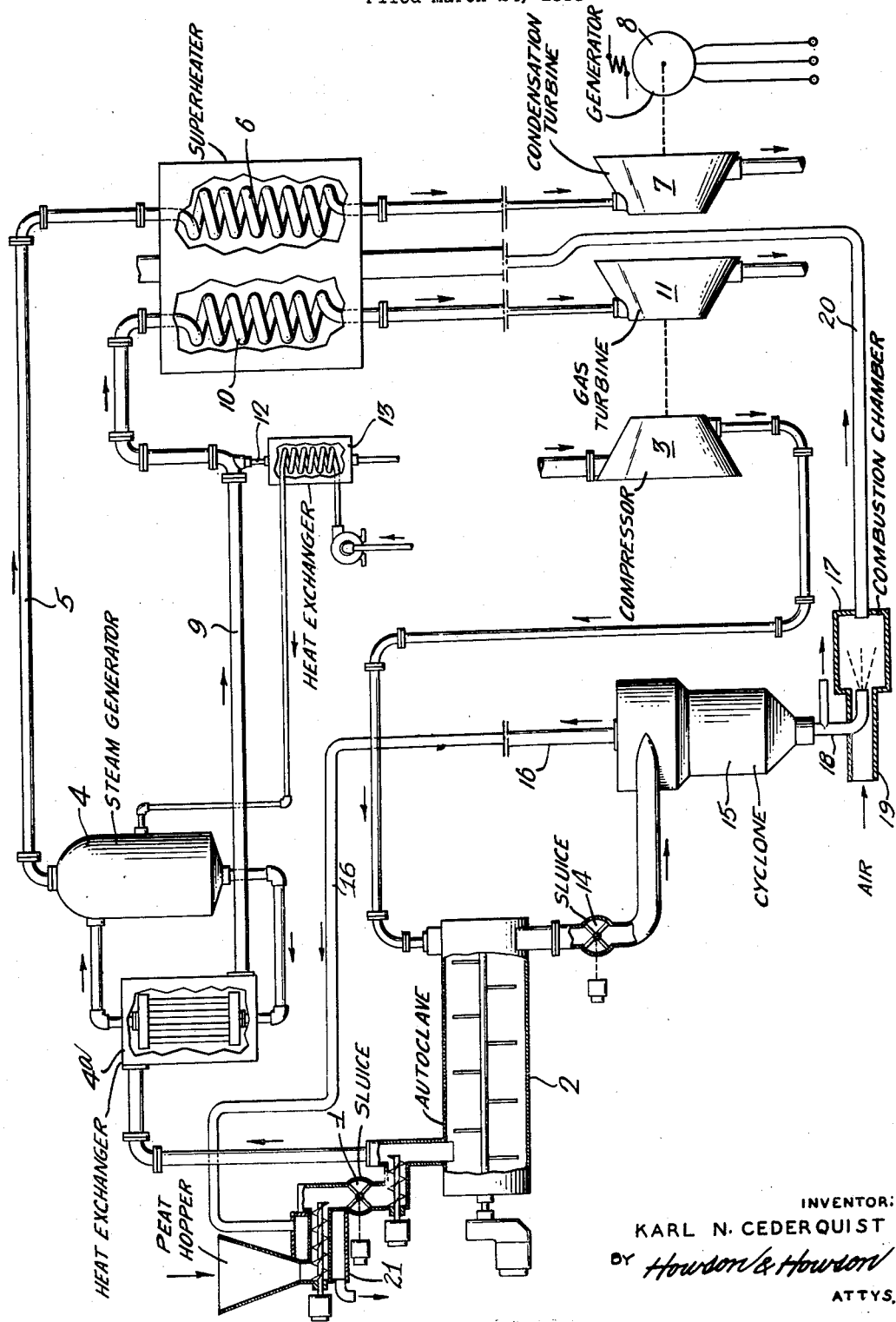
INVENTOR:
KARL N. CEDERQUIST
BY Howson & Howson
ATTYS.

United States Patent Office 2,949,010
Patented Aug. 16, 1960

2,949,010

CONTINUOUS METHOD OF BURNING HIGHLY HYDROUS ORGANIC MATERIALS

Karl Nicolaus Cederquist, Falun, Sweden, assignor to Stora Kopparbergs bergslags Aktiebolag, Falun, Sweden, a joint-stock company limited Filed Mar. 24, 1955, Ser. No. 496,624

Claims priority, application Sweden Oct. 11, 1954

15 Claims. (Cl. 60—39.05)

The invention relates to a continuous method of burning highly hydrous peat.

The most important object of the invention is to provide a method for producing fuel and/or steam and power at low cost.

Another object of this invention is a method for providing directly both a solid fuel and power by the combustion of a peat material in aqueous suspension.

A further object of the invention is to utilize the heat of combustion of peat materials containing a very high percentage of water for evaporation of the water.

It is previously known, i.e. by the British Patents 665,164 and 671,878, to burn peat and similar vegetable materials in the form of aqueous suspensions, during which combustion the organic substance is broken down into carbon dioxide and water by oxidation by means of oxygen, air or other oxygen containing gases at a superatmospheric pressure and an elevated temperature. According to the nature of the peat substance and the desired degree of combustion such a combustion process may be carried out at a temperature between 150 and 300° C. and at a pressure between 20 and 200 atm. gauge. The total pressure will depend on the temperature and the amounts of steam which can be allowed to evaporate and escape together with the combustion gases, i.e., gaseous products of combustion, for maintaining a constant temperature of reaction.

Experiments have shown that it is possible to carry out the combustion of hydrous peat in such a way that substantially the entire amount of water evaporates and escapes as steam mixed with the combustion gases. The remaining residue will be substantially dry or will contain only a minor quantity of water. Due to the water content of the starting material the quantity of organic substance in said residue may vary from 0 and up to almost 100 percent, as calculated on the amount of organic matters in said starting material.

In accordance herewith the invention refers to a continuous method of burning peat materials in the presence of water. Said organic substances are burned in water by means of oxygen or oxygen containing gases at a superatmospheric pressure and an elevated temperature, and the invention resides in that said combustion is carried so far that the essential quantity of water is evaporated. The escaping steam and combustion gas are then supplied under superatmospheric pressure to steam generating means to generate steam free of gaseous combustion products by indirect heat exchange, and finally the dry or moist residue is utilized in a manner hereinafter described According to a more advanced outline of the process the combustion products, entirely or partly freed from steam, may be superheated at a superatmospheric pressure and supplied to an expansion engine, and said steam in said steam generating means may be superheated and supplied to a condensation engine or turbine. Furthermore the combustion may be carried so far that most of the water evaporates, leaving a residue available as fuel. The residue may consist of a mixture of organic and inorganic matters but, if desired, the combustion may be carried out completely so that the residue will consist substantially of inorganic matters.

In that combustion process the lowest concentration of peat substance in the water will be 10 to 12 percent, and in that case the residue will exclusively consist of ash derived from the inorganic matters of the starting material. At a concentration of 15 percent of organic matters the organic portion of the residue will amount to about 30 percent of the original quantity. At higher concentrations of organic substance in the starting material an increased amount of organic matter will remain in the residue, and at a concentration of 30 percent of organic substance the residue will amount to about 70 percent of the original quantity of organic substance. In such a way it is possible to obtain a solid fuel directly without any complicated mechanical methods of concentration, such as pressing, filtering, centrifugating etc.

Of course, a wet combustion process is an expensive method to be used for drying exclusively. However, by carrying out the combustion at superatmospheric pressure it is possible to recover heat from the escaping steam containing combustion products, for instance by heat exchange at superatmospheric pressure, whereby pure low-pressure steam may be obtained and the heat used for the drying is converted into high quality heat.

In several cases this steam may be utilized on the spot where it is produced, but if this is not possible, for instance when producing peat-fuel from a peat-bog, the heat in escaping steam and combustion products must in any way be transformed into electric power.

An essential amount of power may be required to compress the air used for the combustion, depending on the percentile portion of the organic substance to be burned. However, said compression power may be entirely balanced, if the escaping combustion products are superheated at superatmospheric pressure and then allowed to expand in an expansion engine. The power developed on expansion will be sufficient to cover the compression power, even in the case the escaping combustion products are entirely or almost entirely freed from their content of steam.

To achieve a high thermal efficiency by converting the heat in escaping steam and combustion products into mechanical power it is thus suitable to subject the steam and combustion gases to a heat exchange at superatmospheric pressure, so that steam free of combustion products is generated, said steam being superheated and expanded in a condensation engine or turbine. The combustion products freed from a substantial content of steam are then, still at superatmospheric pressure, superheated to a temperature sufficiently high to generate the power required for the compression by expanding in an expansion engine. The superheating of the combustion products may take place in any known manner, for instance by a direct-fired gas-superheater or by mixing said combustion products with an extraordinarily superheated gas produced by combustion of fuel gas, oil or solid fuel at superatmospheric pressure.

The combustion products being freed from steam and being superheated on the superatmospheric pressure leave the expansion engine at a very low temperature, due to the high pressure drop in the engine and thus the losses of heat by the combustion products leaving a wet-combustion system will be very insignificant.

As a portion of the fuel obtained from the wet-combustion process is to be used to superheat the steam for the condensation engine and to superheat the combustion products for the expansion engine, the balance of fuel or its equivalent amount of calories will, of course, be smaller. For instance, a raw peat containing 30 percent of dry substance may yield net about 550 kilograms dry peat fuel and 480–500 kwh., calculated on 1000 kilograms dry material supplied. The heat consumed for the production of power is not greater than 3500–4000 cal./kwh., calculated on the net heating value of the original organic material.

The invention will be more readily understood from the following detailed description and the accompanying drawing in which Fig. 1 is a diagrammatic view illustrating in simplified form one mode of application of the present invention.

An aqueous suspension containing 30%, by weight, on a dry basis, of raw peat, is continuously fed through the sluice 1 to the horizontal autoclave 2 provided with an agitator. The temperature within the autoclave is about 190° C. and the gauge pressure of steam and gases is 25 atmospheres.

Air is supplied to the autoclave from a compressor 3 in such an amount that the heat developed in the combustion is sufficient for evaporating a substantial quantity of water. The steam formed escapes mixed with the gaseous combustion products, which are heat-exchanged under superatmospheric pressure indirectly in the heat-exchange 4a of the steam-generator 4 producing steam of a gauge pressure of 5 atm. The steam is drawn off through the pipe line 5.

After having been superheated up to 500° C. in the super-heater 6 this steam is supplied to a condensation turbine 7 driving an electric generator 8.

The partly cooled gaseous combustion products leaving the steam generator through the pipe line 9 are superheated to about 550° C. still at superatmospheric pressure in the superheater 10 and are then allowed to expand in the gas turbine 11 driving the air compressor 3.

The condensate formed by cooling the gaseous combustion products in the heat-exchanger of the steam-generator is discharged through the pipe line 12 and heat-exchanged with the boiler feed in the heat-exchanger 13.

The peat residue obtained in the autoclave is discharged through the sluice 14 into the cyclon 15 where it is allowed to expand to atmospheric pressure so that remaining water, if any, evaporates through the pipe line 16. The steam thus formed may be used for preheating the entering raw peat in a heat exchanger 21. A portion of the dry fuel discharged from the cyclon 15 may be used for heating the super-heaters 6 and 10. For example, the dry fuel discharged from cyclone separator 15 may be fed through a line 18 to a combustion chamber 17 in which the dry fuel is burned in air provided by means of line 19. The hot gaseous combustion products thus formed escape through line 20 and are passed in indirect heat exchange with superheaters 6—10.

*Example*

A raw peat containing 30% of dry substance is continuously sluiced into a horizontal autoclave provided with an agitator. The temperature within the autoclave is about 190° C. and the total pressure is 25 atm. gauge. Air is supplied to the autoclave from a compressor in such an amount that a substantial quantity of water evaporates and escapes together with the gases formed in combustion. The hot combustion gases or products are heat-exchanged indirectly in a steam generator, producing steam of 5 atm. gauge. After having been superheated up to 500° C. said steam is supplied to a condensation turbine connected to an electric generator. The cooled combustion products leaving the steam generator are superheated to about 550° C., still at superatmospheric pressure, and are then allowed to expand in a gas turbine connected to the air compressor or an electric generator. The combustion products leave the gas turbine at a temperature of about 50–100° C. and thus the heat power of the combustion products is rather completely utilized. The residue obtained in the autoclave is passed through a sluice into a cyclone separator where it is allowed to expand to atmospheric pressure so that remaining water, if any, evaporates. The steam thus formed is used to preheat the entering raw peat. A portion of the dry fuel discharged from the autoclave is used for superheating steam and combustion gases.

The example given above should in no way be regarded as involving any restriction and the method according to the invention may be varied in several ways within the scope of the appended claims. Thus, the invention is not limited to peat but may be used for different similar kinds of highly hydrous organic materials of suitable concentration. Such materials may be, for instance, finely divided wood, saw dust, and so on.

Valuable inorganic chemicals in the starting material may be recovered from the solid fuel or they may form the essential part of the residue, in which case they are recovered in more or less concentrated form.

According to the nature of the peat material and the percentage of inorganic material present the residue obtained may be used as fuel, fertilizer, etc. When the residue obtained is to be used as fertilizer it preferably may be admixed with phosphorus or nitrogen containing agents.

Having now described the invention, what I claim as new and desire to secure by Letters Patent, is:

1. A method for producing fuel and power from an aqueous suspension of a peat material which comprises, supplying said aqueous suspension to a combustion zone maintained under superatmospheric pressure, supplying an oxygen-containing gas to said combustion zone, combusting a portion of said peat material forming said suspension by means of said oxygen-containing gas at a temperature in the range between about 150° and 300° C. to evaporate a portion of the water forming said suspension, employing the gaseous combustion products and vaporized portion of said water for the production of power, removing the hot, unburned portion of said peat material and remaining water from said combustion zone to cause evaporation of said remaining water under substantially atmospheric pressure, the quantity of water evaporated during said combustion providing a solid fuel comprising said unburned portion of said peat material upon evaporation of said remaining water under atmospheric pressure.

2. The method according to claim 1 in which said aqueous suspension comprises at least about 10%, by weight, of peat material.

3. The method according to claim 1 in which said aqueous suspension comprises from about 10 to about 30%, by weight, of peat material.

4. The method according to claim 1 in which said combustion zone is maintained at a pressure of from about 20 to 200 atm. gauge.

5. The method according to claim 1 in which the quantity of water evaporated during said combustion provides a substantially dry, solid fuel comprising said unburned portion of said peat material upon evaporation of remaining water under atmospheric pressure.

6. The method according to claim 1 in which said gaseous combustion products and water vapor from said combustion zone are supplied under superatmospheric pressure to steam generating means to generate steam by indirect heat exchange therein.

7. The method according to claim 6 in which said gaseous combustion products supplied to said steam generating means are thereafter superheated under superatmospheric pressure and passed through an expansion engine to produce power.

8. The method according to claim 6 in which said steam produced in said steam generating means is passed through a condensation engine to produce power.

9. The method according to claim 7 in which said solid fuel is combusted and the resulting hot, gaseous combustion products are employed to superheat said gaseous combustion products from said steam generating means.

10. The method according to claim 7 in which power produced by said expansion engine is employed to compress said oxygen-containing gas supplied to said combustion zone.

11. A continuous method for producing fuel and power from an aqueous suspension of a peat material which comprises continuously supplying an aqueous suspension comprising from about 10 to about 30%, by weight, of a peat material to a combustion zone maintained at a pressure of from about 20 to 200 atm. gauge, continuously supplying an oxygen-containing gas to said combustion zone, continuously combusting a portion of said peat material forming said suspension by means of said oxygen-containing gas at a temperature in a range between about 150° and 300° C. to evaporate a portion of the water forming said suspension, continuously supplying the gaseous combustion products and vaporized portion of said water under superatmospheric pressure to steam generating means to generate steam by indirect heat exchange therein, continuously removing the hot, unburned portion of said peat material and remaining water from said combustion zone to cause evaporation of said remaining water under substantially atmospheric pressure, the quantity of water evaporated during said combustion providing a substantially dry, solid fuel comprising said unburned portion of said peat material upon evaporation of remaining water under atmospheric pressure.

12. The method according to claim 11 in which said gaseous combustion products supplied to said steam generating means are thereafter superheated under superatmospheric pressure and passed through an expansion engine to produce power.

13. The method according to claim 11 in which said steam produced in said steam generating means is passed through a condensation engine to produce power.

14. The method according to claim 12 in which said solid fuel is combusted and the resulting hot, gaseous combustion products are employed to superheat said gaseous combustion products.

15. The method according to claim 12 in which power produced by said expansion engine is employed to compress said oxygen-containing gas supplied to said combustion zone.

References Cited in the file of this patent
UNITED STATES PATENTS

| | | |
|---|---|---|
| 2,055,385 | Noack | Sept. 22, 1936 |
| 2,648,950 | Miller | Aug. 18, 1953 |
| 2,650,190 | Steinschlaeger | Aug. 25, 1953 |
| 2,668,099 | Cederquist | Feb. 2, 1954 |
| 2,677,235 | Secord | May 4, 1954 |
| 2,735,265 | Eastman | Feb. 21, 1956 |
| 2,761,824 | Eastman et al. | Sept. 4, 1956 |
| 2,781,635 | Brogdon | Feb. 19, 1957 |